United States Patent [19]

Hurst

[11] 4,396,802

[45] Aug. 2, 1983

[54] ASWIXS REMOTE SPEAKER AND HANDSET SET

[75] Inventor: Dennis P. Hurst, San Diego, Calif.

[73] Assignee: The United States of America as represented by the Secretary of the Navy, Washington, D.C.

[21] Appl. No.: 267,937

[22] Filed: May 28, 1981

[51] Int. Cl.³ ............................................ H04M 1/68
[52] U.S. Cl. ................................................ 179/1.5 R
[58] Field of Search ............. 179/1.5 R, 1.5 M, 81 B, 179/103; 455/33, 57, 77, 79

[56] References Cited
U.S. PATENT DOCUMENTS

| 2,458,558 | 1/1949 | Bradley | 455/57 |
| 2,883,521 | 4/1959 | Curry | 455/33 |
| 3,114,800 | 12/1963 | Simpkins | 179/103 |
| 3,169,221 | 2/1965 | Franch | 455/79 |
| 3,321,580 | 5/1967 | Horne et al. | 179/81 B |
| 3,497,623 | 2/1970 | Todd | 179/1.5 M |
| 3,541,258 | 11/1970 | Doyle et al. | 179/1.5 M |
| 3,718,765 | 2/1973 | Halaby | 179/1.5 R |
| 3,775,562 | 11/1973 | Crimmins et al. | 179/1.5 R |
| 4,153,877 | 5/1979 | Fathauer et al. | 455/77 |

Primary Examiner—Sal Cangialosi
Attorney, Agent, or Firm—Robert F. Beers; Ervin F. Johnston; Thomas Glenn Keough

[57] ABSTRACT

A remote speaker and handset unit is interfaced with a satellite communications system and a number of common users. A vocoder is interposed between each unit and the communications system to enable a real-time voice modulation-demodulation with suitable encryption. Means are provided for permitting a user to listen over a loudspeaker and to interrupt the loudspeaker with the handset when it is desired to transmit a transmission.

1 Claim, 4 Drawing Figures

ASWIXS REMOTE SPEAKER AND HANDSET SET

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Communication systems networks are many and varied in design. The particular application of one will call into play certain aspects of communication technology while another will rely on another way of solving its own problems. Irrespective that a highly complicated multiplex system or a single wire, two-party communicator is involved, each can be modified to vastly increase their capabilities.

Audio communication systems among which several users share a common transmission bus or data link are in widespread application. These can be as complex or simple as their intended use and generally have microphones and loudspeakers at user-terminals. Probably one of the most well known, typical terminals is a mobile citizen band transceiver. Another is the conventional telephone receiver which restricts the conversation between parties holding their headsets next to their ears and mouths. Modifications or combinations of the transceiver and the telephone have been tried to enable the monitoring of network conversations and to have a degree of privacy for calls to and from the network.

One such attempt was tried by A. B. Simpkins in his U.S. Pat. No. 3,114,800. An attachment was added for a telephone handset that encoded and decoded information among a number of users. The modified handset had to be hand held and suitably actuated to perform as expected and had no capability for allowing one or a number of users from monitoring all system traffic. A later design by S. M. K. Horn et al appearing in U.S. Pat. No. 3,321,580 disclosed a hands-free communication system including certain privacy features. Microphone loudspeaker combinations were responsive to a pair of signal tones for actuating microphones or loudspeakers at opposite ends or along receiver terminals in the communications link. This enabled a bit of selectivity among users. U.S. Pat. No. 3,497,623 to B. F. Todd discloses a device for securing telephone conversations that mixes loudspeaker projected noise along with voice in a microphone. The secured communication system allows two or more persons to communicate without the possibility of being overheard by eavesdroppers or concealed recording devices. The speaker is for projecting noise for blanketing speech at a conventional telephone handset. A later effort by W. C. Doyle et al in U.S. Pat. No. 3,541,258 discloses a conference communication system. Earphones and cranial microphones induce speakers to speak in a lower volume so that prerecorded sounds can mask communications between designated users. A selectivity between simply monitoring a network's communication with the option to interrupt and contribute or monitor on a more secure basis is nominal.

Joseph Hallaby in his U.S. Pat. No. 3,718,765 modified a telephone communication system with noise signals that are alleged to provide for a degree of secrecy. A number of noise generators strategically located throughout the system help provide improved secure communications; yet, the option for open and free monitoring along with secured communication through a handset is not found. In like manner, James W. Crimmins, U.S. Pat. No. 3,775,562 shows a noteworthy step forward in the state-of-the-art for assuring a secure telephone communication system; however, certain situations could make a hands-free capability an advantageous modification.

Thus there is a continuing need in the state-of-the-art for a communication system joining a number of users that allows an optional hands-off monitoring and a secure bidirectional communication that does not overly compromise the system's reliability.

SUMMARY OF THE INVENTION

The present invention is directed to providing an improvement for communication system having a number of users each connected to a satellite communications system through their own vocoders. A loudspeaker audioly broadcasts the entire communications of the system and a handset provides for transmission when suitably connected switches selectively decouple the speaker from the system and selectively couple the handset into the system and for optionally switching the speaker back into the system when the handset is disconnected to give a hands-free monitoring capability.

A prime object of the invention is to provide an improvement for an existing communication system.

Yet another object is to provide an improvement for vocoder-communication systems that extends the capabilities without overly compromising reliability.

Yet another object is to provide an improvement for a communication system assuring freely accessible monitoring.

Still a further object of the invention is to assure a cost effective modification for voice communication systems that provides for hands-free monitoring.

Yet a further object is to provide a speaker and keyed handset suitably connected to improve the capabilities of a voice communication system.

These and other objects, advantages and novel features of the invention will become apparent from the following detailed description of the invention when considered in conjunction with the accompanying drawings.

DESCRIPTION OF THE PREFERRED EMBODIMENT

Figure 1:
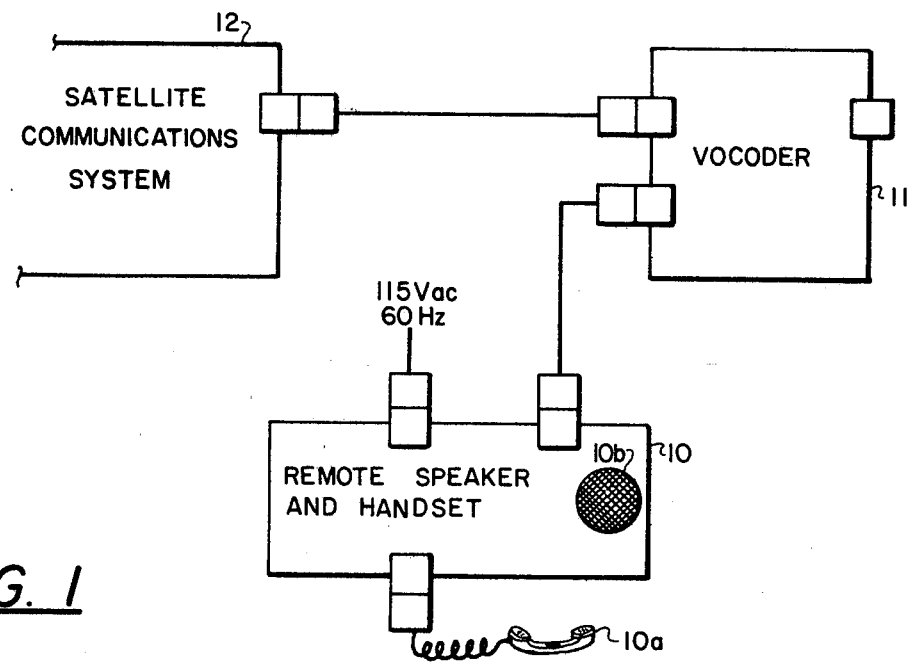
FIG. 1 is a block diagram representation of the invention.

Referring now to the drawings, a remote speaker and handset unit 10 is connected via a vocoder 11 to a communication system 12. The communication system has a number of users suitably interfaced to bidirectionally communicate over a satellite channel or hf medium, or similar transmission channel. The vocoder provided for each user in the system has suitable circuitry for taking digital information from the communications system and converting it to intelligible analog speech that is delivered to its speaker, and to take speech and appropriately convert it to digital signals for transmission throughout the system. Both the system and the vocoders are well known in the arts and, for the sake of brevity, further discussion is unwarranted.

Figure 2:
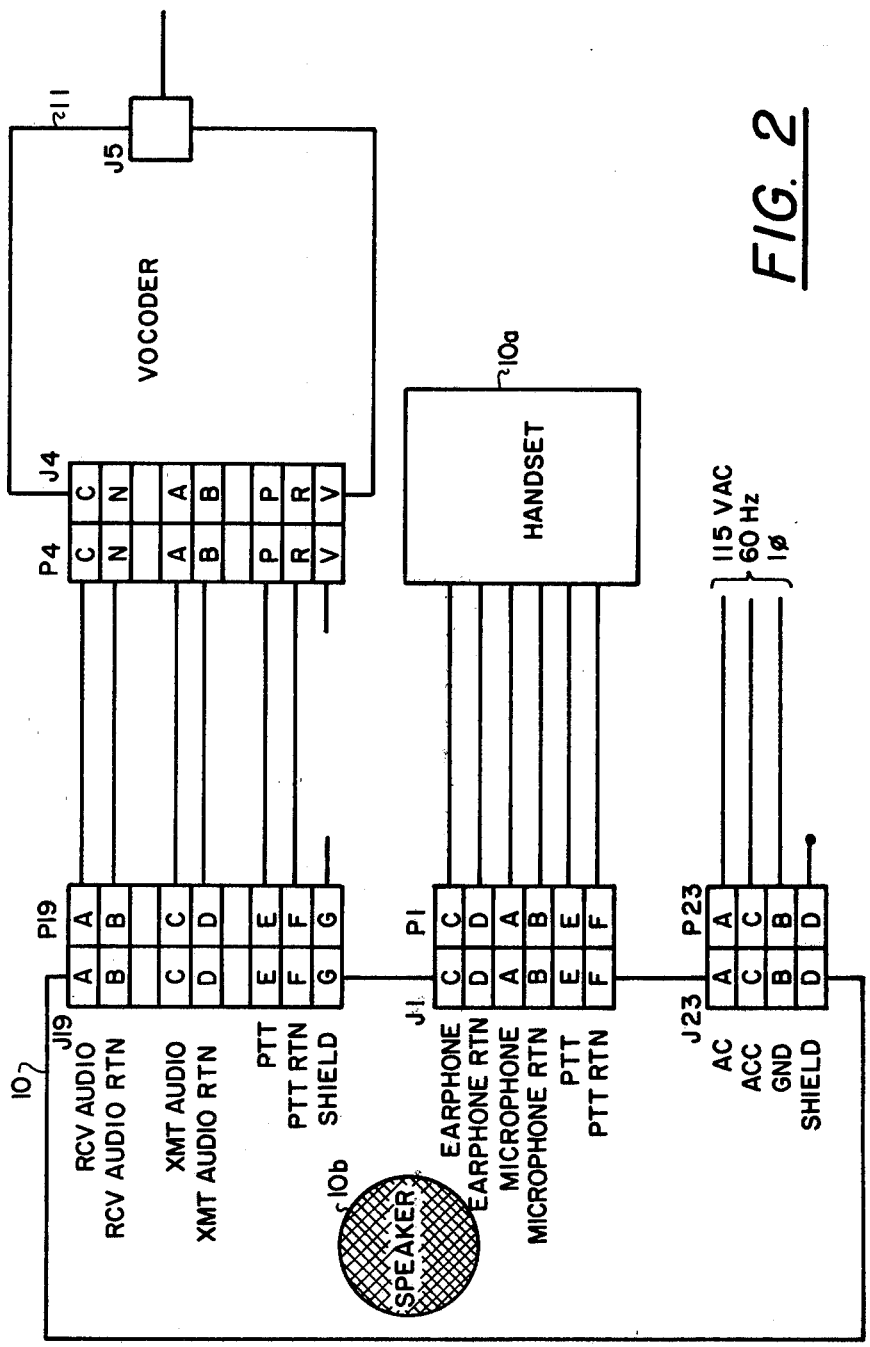
FIG. 2 is a block diagram representation depicting details of some of the constituents.

The remote speaker and handset unit has a handset 10a coupled via a mating connector J1-P1 and connection to the vocoder 11 via the unit's connectors J19 and P19 and the mating portions of the vocoder's connector plug P4-J4 (see FIG. 2). A capability may be included if needed to modify the P4-J4 coupling to allow an additional speaker and handset unit to share the same vocoder; however, for the purposes of this disclosure let it suffice to say that each vocoder is coupled to but one speaker and handset unit. The unit's speaker 10b is hard wired to the 8-ohm-output of an amplifier 13 (see FIG. 4).

The speaker and handset unit is connected to a conventional 115 volt a.c. 60-Hz power supply through the mating pins of connector J23-P23. This assures that this unit along with others in the system can function independently without compromising the system's performance by creating excessive power drains.

Figure 3:
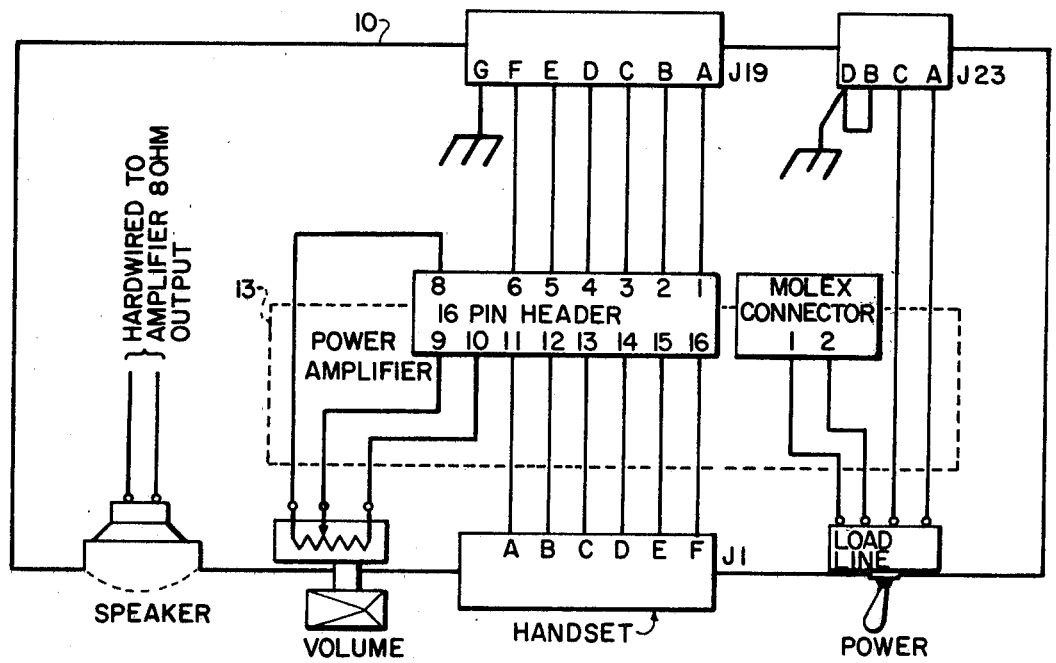
FIG. 3 sets forth details of a feature of the invention.

Referring to FIG. 3, the internal couplings of the speaker and handset unit show the unit's portions of mating connectors interfacing with a common sixteen pin header. The connections designated HDR1 through HDR16 are shown with the unit's internal circuitry in greater detail in FIG. 4.

Handset 10a has an earphone 10a' and a microphone or mouthpiece 10a" that are selectively enabled by a push-to-talk switch 10a'''. Depressed, the switch places the mike and earphone in the unit's circuit and disconnects speaker 10b. This couples the mike and earphone to the vocoder and system through the pins J19-C, D, E and F. The depressing of switch 10a''' closes the circuits on a pair of solenoids 14 and 15 which switch their contacts 14a and 15a. Contact 14a breaks the speaker circuit and completes an earphone circuit to the J19 connector. Simultaneously, contact 15a closes the circuit to place microphone 10a" in a closed circuit with J19. Thus it can be seen that closing of the switch 10a''' and switches 14 and 15 cooperate to disable speaker 10b and couple earphone 10a' and microphone 10a" into the system when a more secure bidirectional communication through the handset 10a is desired.

Figure 4:
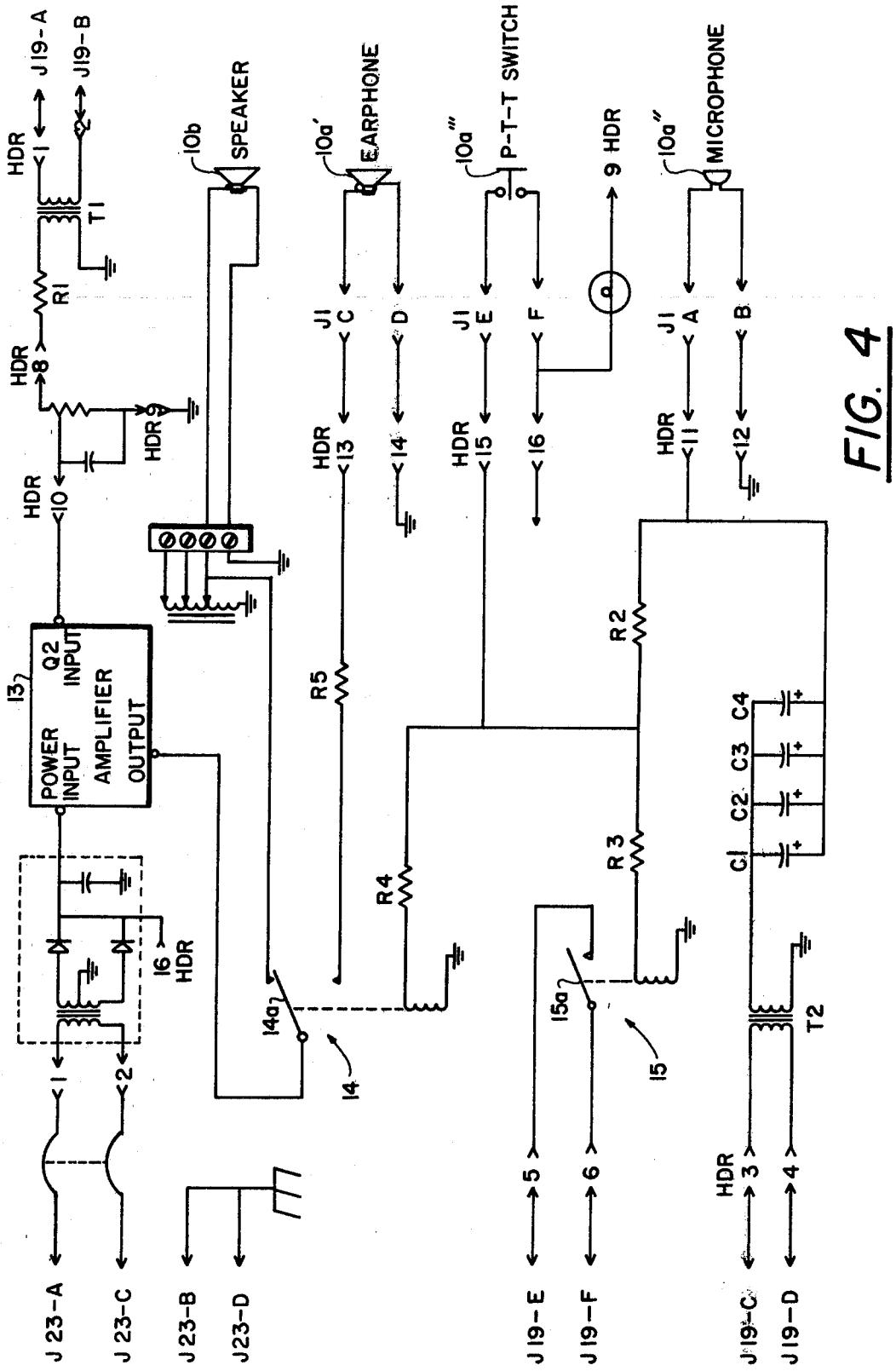
FIG. 4 is a schematic diagram elaborating on the interconnection of the salient features of the invention.

When hands-free monitoring of the system is wanted switch 10a''' is released, the solenoid switches 14 and 15 are relaxed to the position shown in FIG. 4 and speaker 10b once again projects the system's traffic to all interested listeners.

Obviously many modifications and variations of the present invention are possible in the light of the above teachings. It is therefore to be understood that within the scope of the appended claims the invention may be practiced otherwise than as specifically described.

What is claimed is:

1. In a communication system having a number of users each connected through a vocoder an improvement therefor is provided comprising:
   a speaker for audioly broadcasting the communications of the system;
   a keyed handset having an earphone and a microphone for providing a restricted listening to the communications of the system and for entering audio communications into the system;
   a push-to-talk switch connected to a first solenoid switch electrically coupled to the speaker and to a second solenoid switch electrically coupled to the keyed handset for selectively decoupling the speaker from the system and for selectively coupling the keyed handset having an earphone and a microphone into the system when the speaker is decoupled and vice versa and
   at least one suitably connected pin header for interfacing the speaker, the keyed handset and the push-to-talk switch.

* * * * *